(12) United States Patent
Colarusso

(10) Patent No.: US 8,967,564 B2
(45) Date of Patent: Mar. 3, 2015

(54) TREE MOUNT BRACKET

(71) Applicant: Philip A. Colarusso, East Aurora, NY (US)

(72) Inventor: Philip A. Colarusso, East Aurora, NY (US)

(*) Notice: Subject to any disclaimer, the term of this patent is extended or adjusted under 35 U.S.C. 154(b) by 0 days.

(21) Appl. No.: 13/963,102

(22) Filed: Aug. 9, 2013

(65) Prior Publication Data

US 2014/0042291 A1 Feb. 13, 2014

Related U.S. Application Data

(60) Provisional application No. 61/681,185, filed on Aug. 9, 2012.

(51) Int. Cl.
| | |
|---|---|
| *A47B 96/06* | (2006.01) |
| *F21V 21/00* | (2006.01) |
| *F21V 21/08* | (2006.01) |
| *F21V 21/30* | (2006.01) |
| *F21W 131/10* | (2006.01) |

(52) U.S. Cl.
CPC ............... *F21V 21/00* (2013.01); *F21V 21/08* (2013.01); *F21V 21/30* (2013.01); *F21W 2131/10* (2013.01)
USPC .............. 248/219.3; 248/181.2; 248/218.4; 248/288.31; 362/647

(58) Field of Classification Search
CPC .......... F21V 21/00; F21V 21/08; F21V 21/30; F21W 2131/10
USPC ............ 248/51, 156, 181.1, 181.2, 217.4, 248/219.3, 288.31, 481, 520–522, 530, 533, 248/536, 538, 540, 541; 47/42, 43; D8/387; 182/92; 362/191, 226, 382, 647; 411/401

See application file for complete search history.

(56) References Cited

U.S. PATENT DOCUMENTS

| | | | | |
|---|---|---|---|---|
| 1,202,518 | A | * 10/1916 | Henwood | 248/207 |
| 2,767,513 | A | * 10/1956 | Bluestone | 248/188.4 |
| 3,785,604 | A | 1/1974 | Steck | |
| 5,310,151 | A | 5/1994 | Engel | |
| 5,504,397 | A | * 4/1996 | Chien | 315/185 S |
| 5,667,174 | A | 9/1997 | Adams | |
| 5,669,592 | A | 9/1997 | Kearful | |
| 5,944,139 | A | 8/1999 | Kozial | |
| 6,135,401 | A | * 10/2000 | Chen | 248/188.5 |
| 6,752,516 | B1 | * 6/2004 | Beadle | 362/647 |
| 6,908,067 | B2 | * 6/2005 | Clasen | 248/533 |
| 7,077,612 | B1 | 7/2006 | Diggle, III | |
| 7,789,607 | B2 | 9/2010 | Fuest | |
| 8,087,626 | B1 | * 1/2012 | Weeden | 248/218.4 |

* cited by examiner

*Primary Examiner* — Gwendolyn W Baxter
(74) *Attorney, Agent, or Firm* — Del Vecchio and Stadler LLP

(57) ABSTRACT

A tree mount bracket having a threaded member and a fixture support member that are joined to one another. The threaded member includes a shaft with a tip and a head and external threads. The fixture support member has a housing that includes a cylindrical wall and a base wall that defines a base wall opening. The cylindrical wall also defines a wire slot for accommodating a wire. The fixture support member can be embodied as a side mounted fixture support member; two side mounted fixture support members; a fixture support plate; a fixture support assembly; and, a ball shaft and a tightening ring.

8 Claims, 9 Drawing Sheets

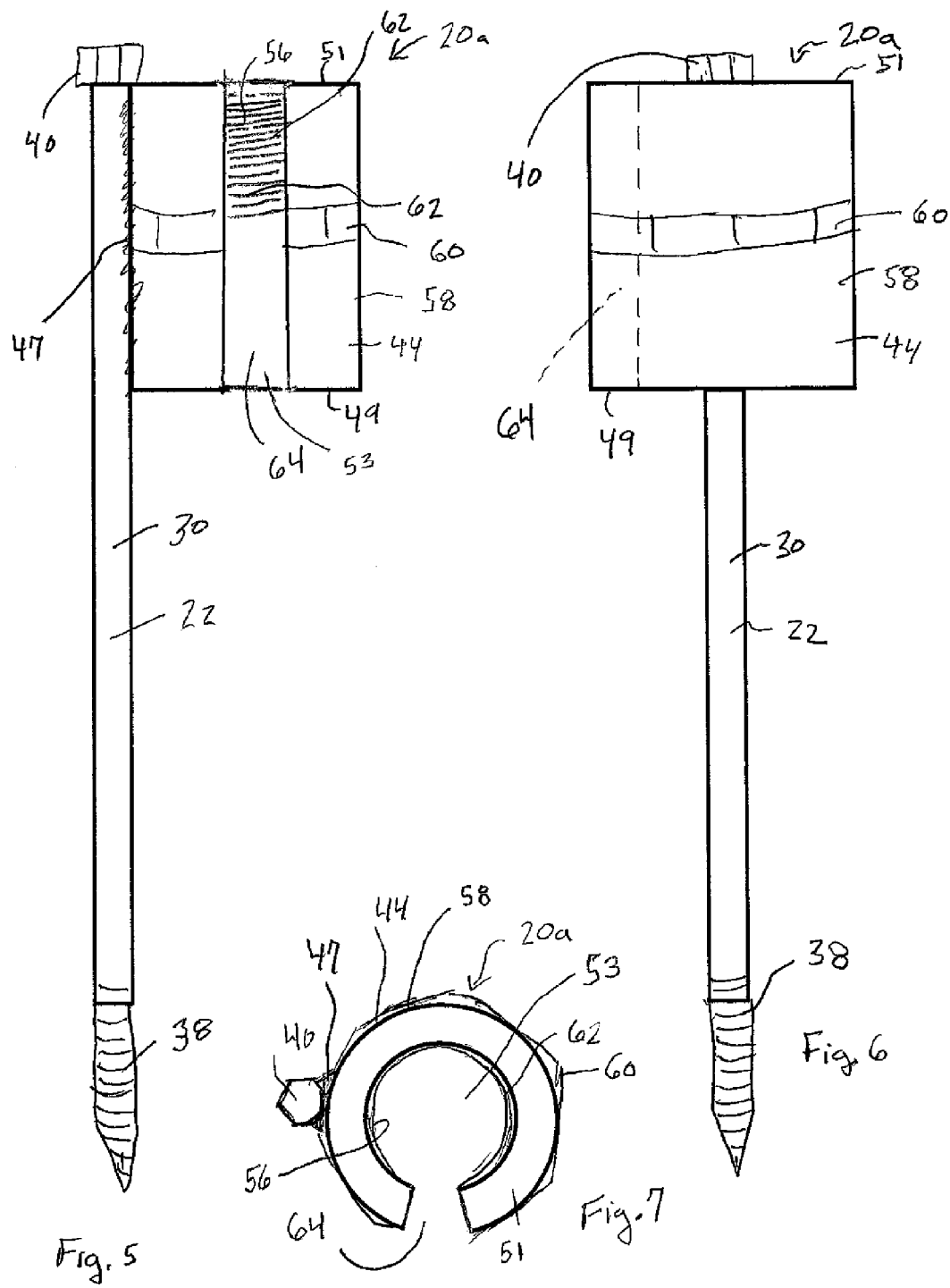

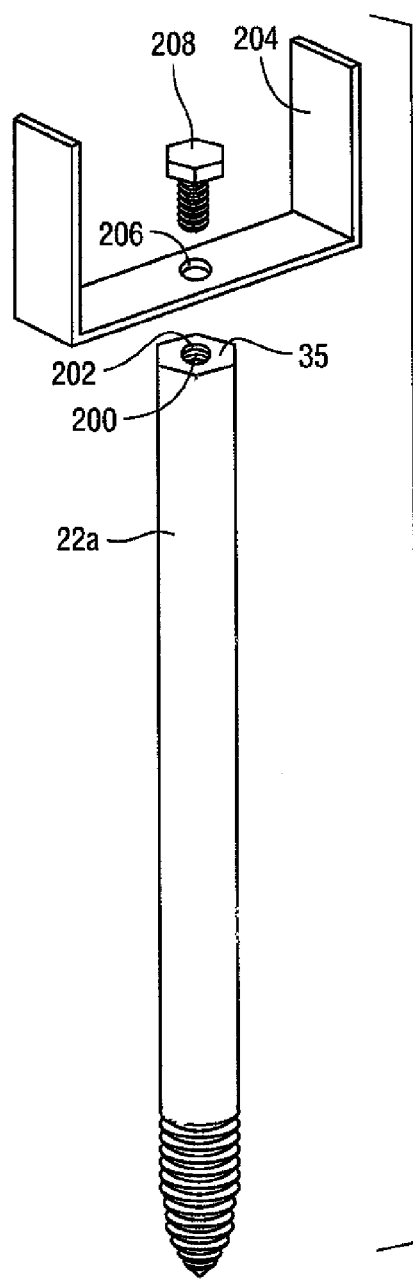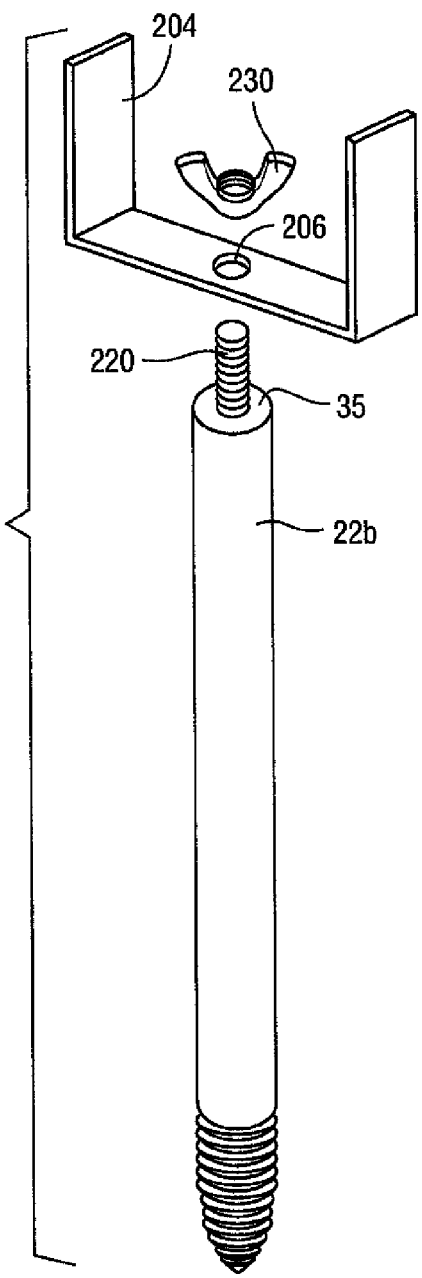

Figure 1:
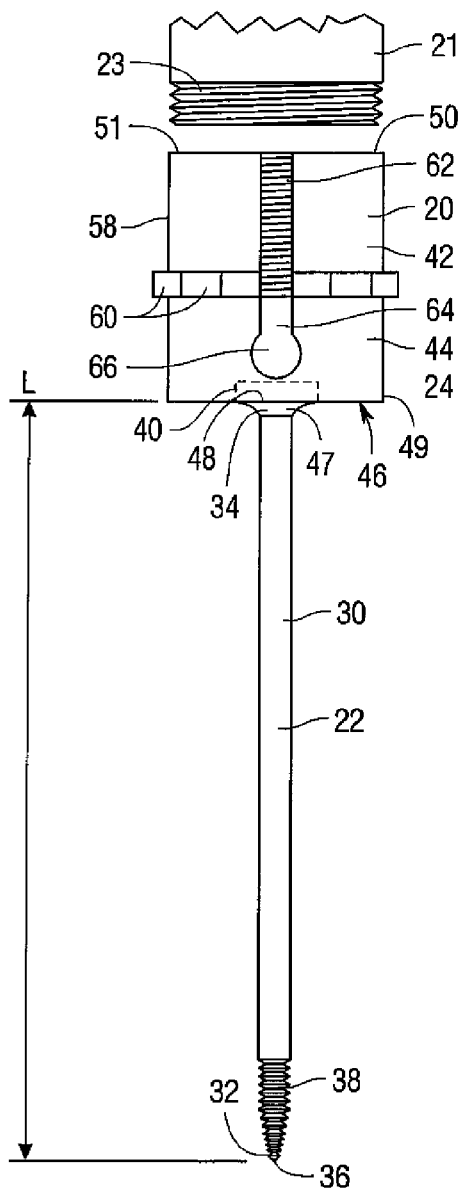

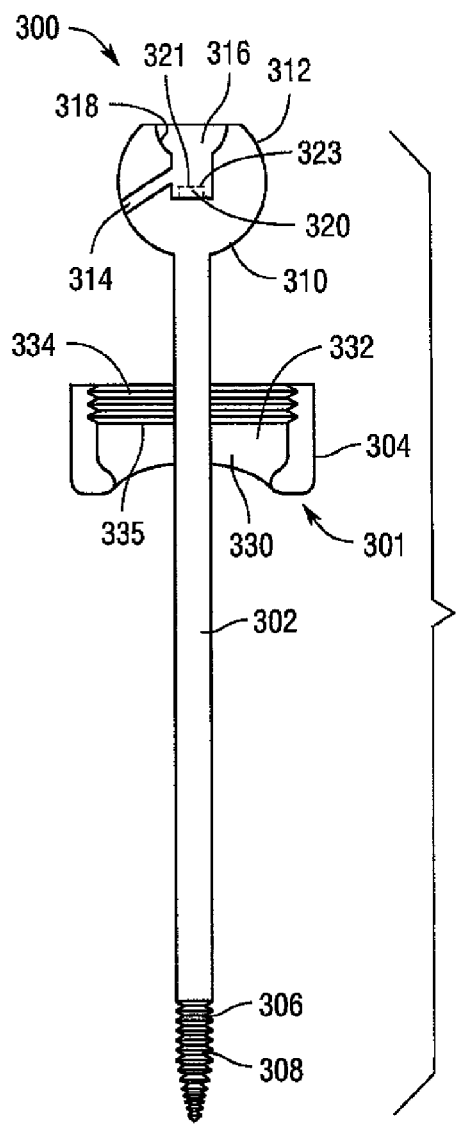
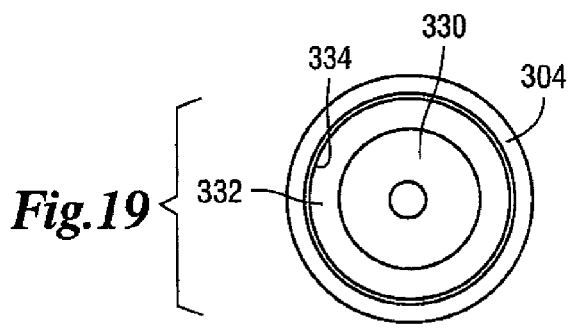
Fig.17
Fig.18
Fig.19

TREE MOUNT BRACKET

CROSS REFERENCE TO RELATED APPLICATION

This application claims the benefit of U.S. Provisional Application No. 61/681,185 filed on Aug. 9, 2012 the entire disclosure and content of which is hereby incorporated herein by reference.

BACKGROUND

People have long had a need to have a source of outdoor lighting on their properties. Such lighting is particularly useful to home and business owners so that they can conduct outdoor activates at night. Outdoor lighting is also used to highlight the architectural features of buildings and to illuminate plants and trees. Of course, another purpose of outdoor lighting is to deter criminal activity.

For these reasons people frequently attach lighting fixtures to trees because they are so common and because they are very sturdy. One common way people attach lighting fixtures to trees is to wrap a belt or cable around the trunk (or branch) of the tree and then attach the light fixture to the belt or cable. Of course, the problem with this is that as the tree grows it will grow around the cable. The use of cables and belts has resulted in the death or damage to many trees when the property owner fails to adjust the cable every few years. Unfortunately, many property owners do not adjust the belts in a timely manner because they forget to do so, and because the cable is too high in the tree and they simply do not have the means to reach the cable.

Other devices for mounting light fixtures to trees are also used. For example, people use a plurality of screws to mount plates to the tree in order to support the lighting device. However, the tree quickly grows into the device. So, the property owner must make adjustments to the device every few years, and this is both time consuming and dangerous if the device is mounted high in a tree. Typically the property owner completely fails to adjust the device and the device literally ends up embedding in the tree. This can result in a significant injury to the tree in that the tree may rot in the vicinity of the device. In addition, these devices call for two hands to install. This presents a danger if the person installing/adjusting the device is high in the tree, as he or she has no free hands to hold onto the tree with in the event he or she slips. Indeed, many people have fallen from trees when using such devices.

Thus, there is a need for a device that allows lighting fixtures to be attached to a tree trunk in a quick and efficient manner, and does not call for the use of two hands and is inexpensive to manufacture.

SUMMARY

Tree mount brackets are provided for securing light fixtures to trees with a single point attachment to the tree. The tree mount bracket has a threaded member and a fixture support member that are joined to one another. The threaded member includes a shaft with a tip and external threads at one end and a head at the other end. The fixture support member has a housing that includes a cylindrical wall and a base wall that defines a base wall opening. The cylindrical wall also defines a wire slot for accommodating a wire. The housing is threaded to a light fixture and supports the light fixture.

The fixture support member can be embodied as a side mounted fixture support member; two side mounted fixture support members; a fixture support plate; and a fixture support assembly. In another preferred embodiment there is a tree mount bracket having a ball shaft and tightening ring.

BRIEF DESCRIPTION OF THE DRAWING FIGURES

Figure 2:
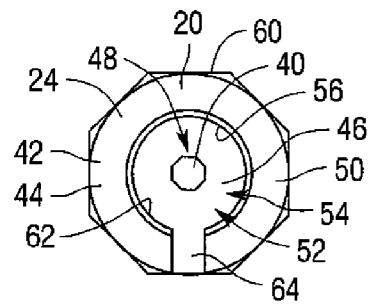
Figure 3:
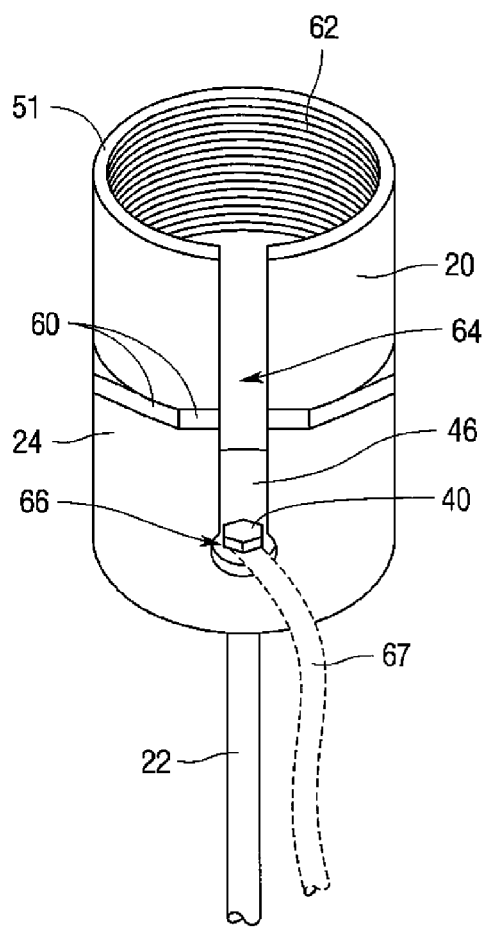
Figure 4:
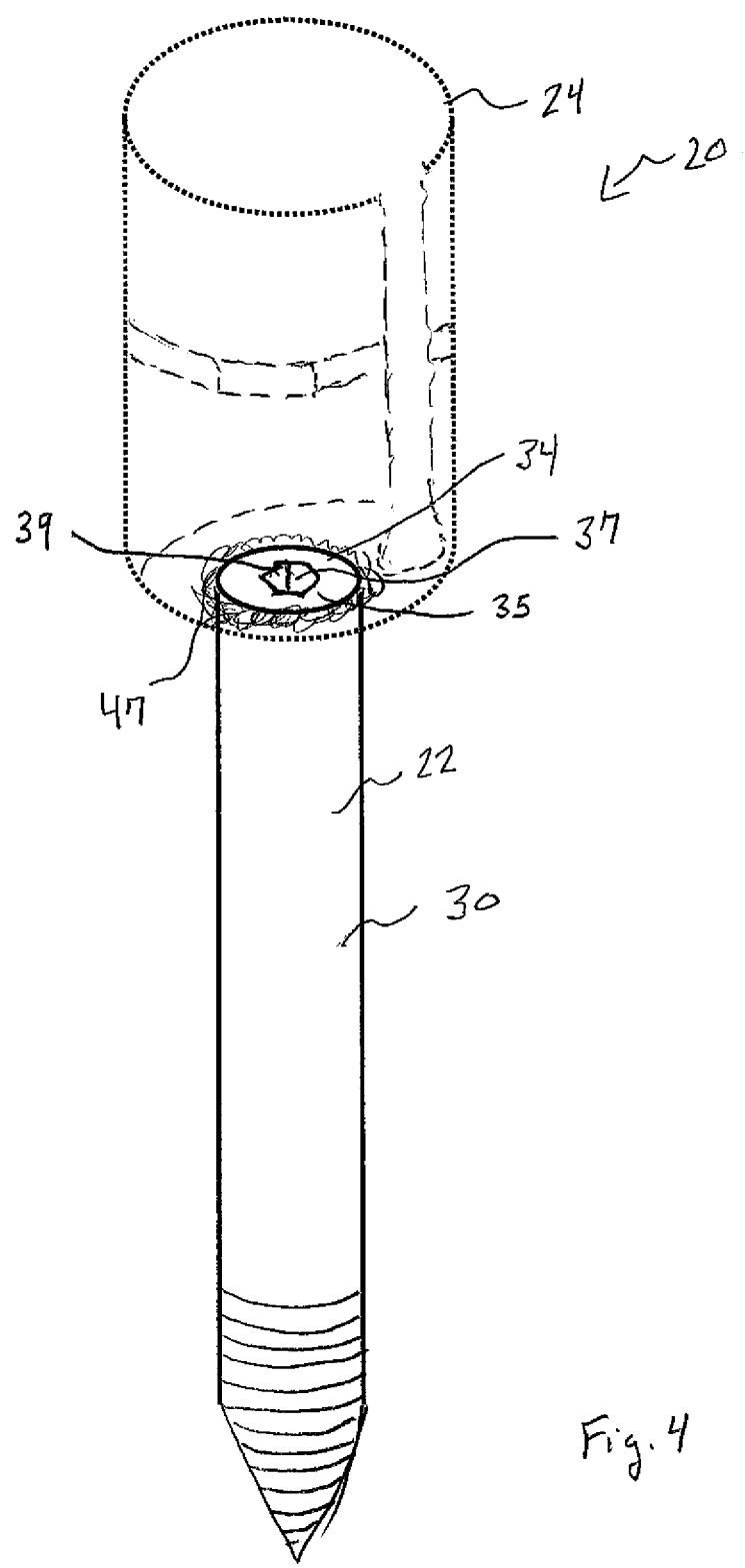
Figures 8, 9:
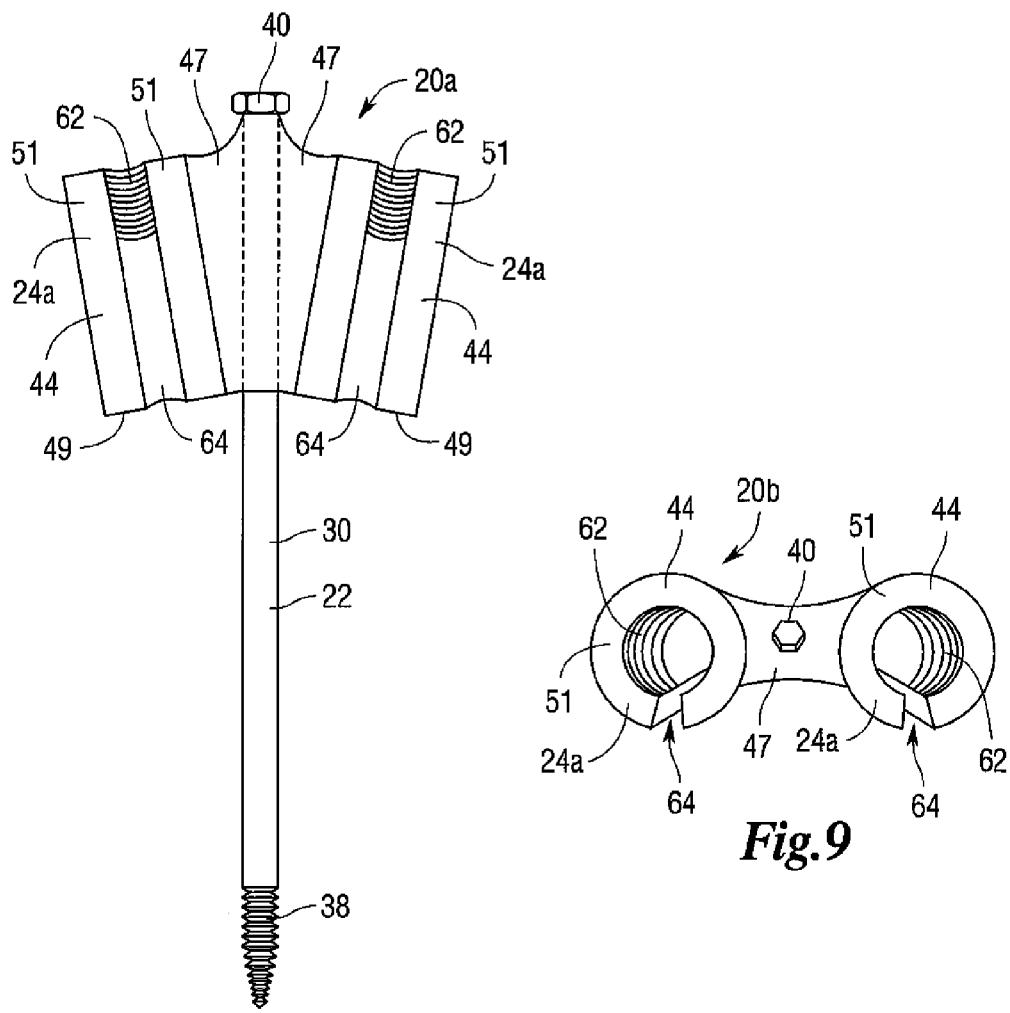
Figure 10:
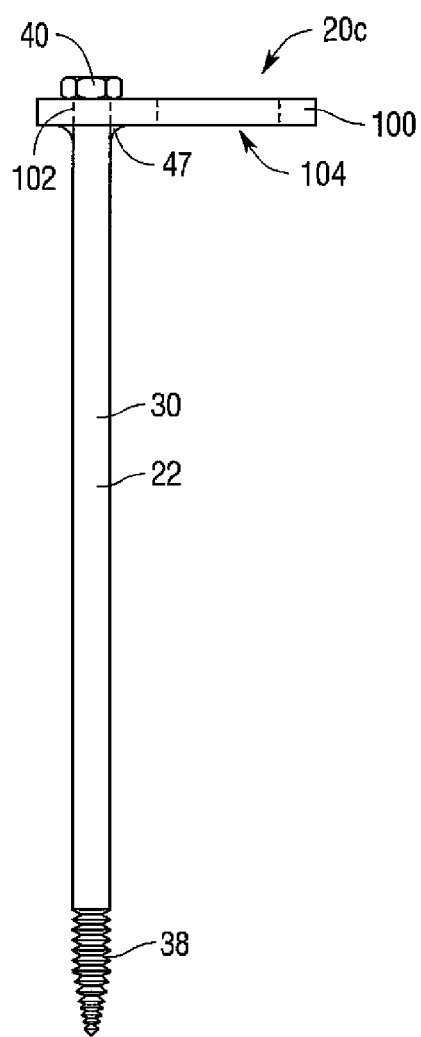
Figure 11:
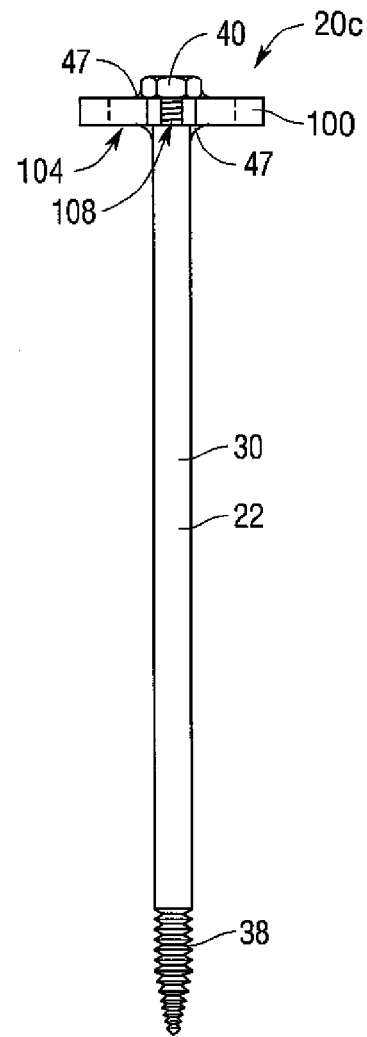
Figure 12:
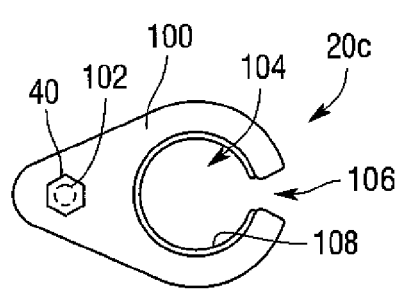
Figures 13, 14:
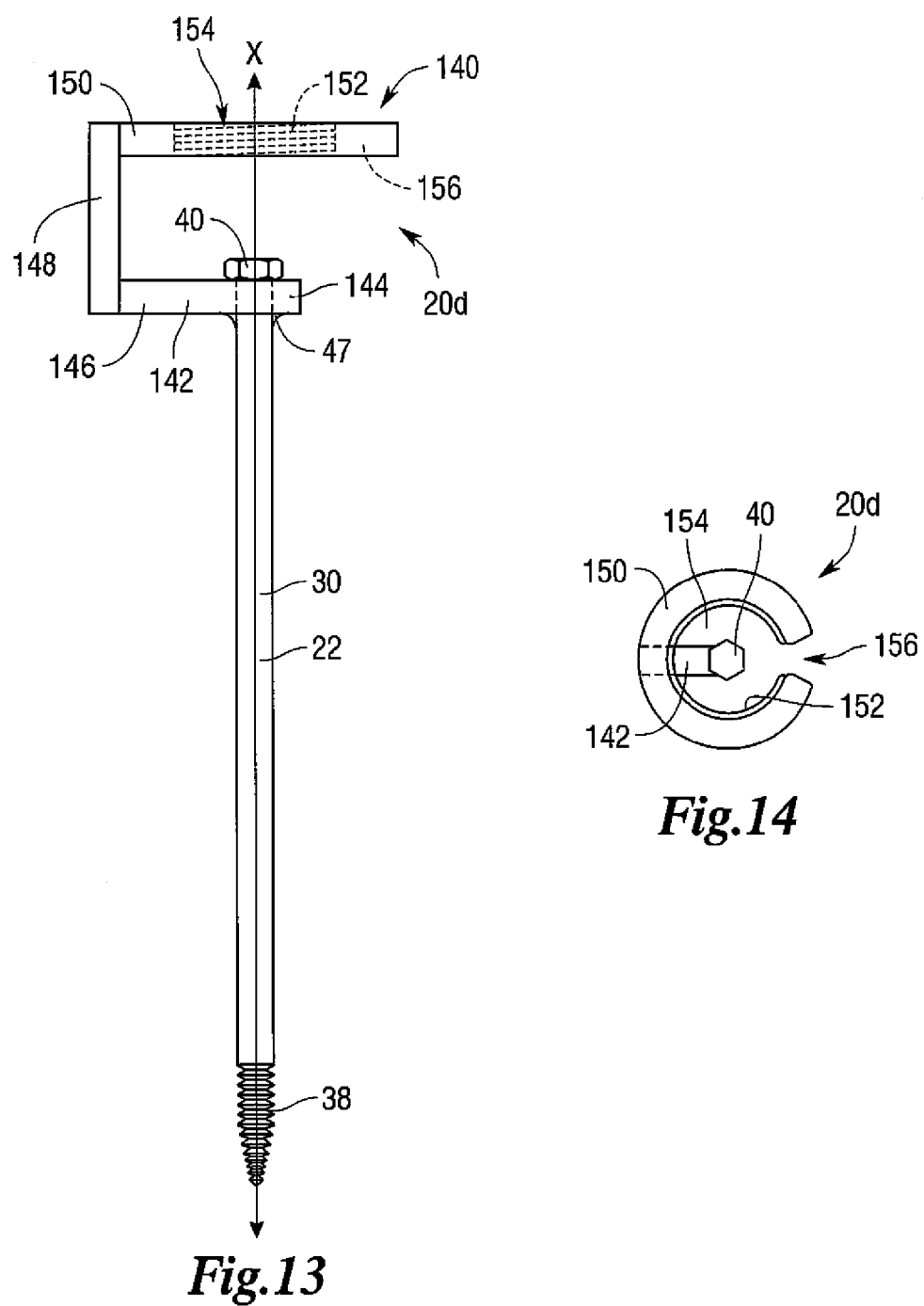
Figure 20:
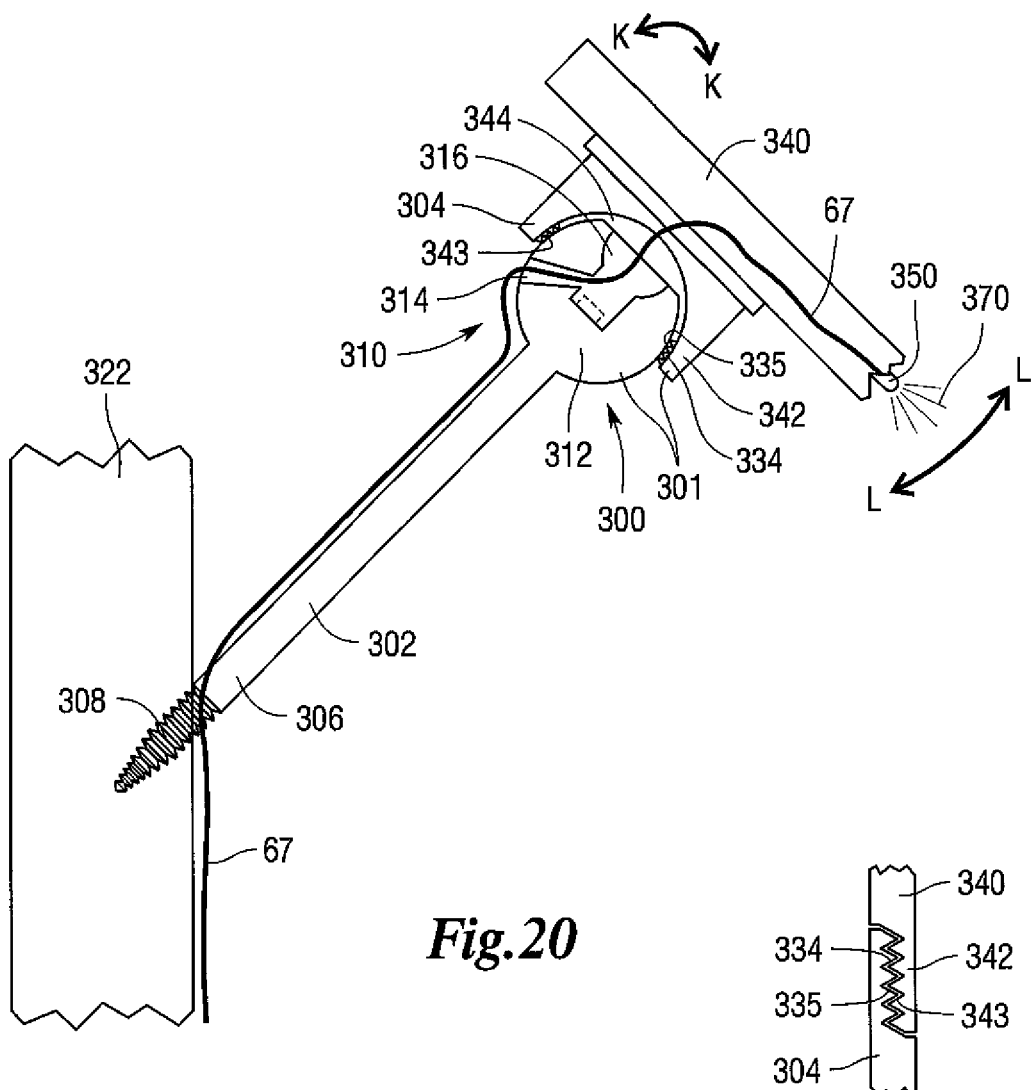
Figure 21:
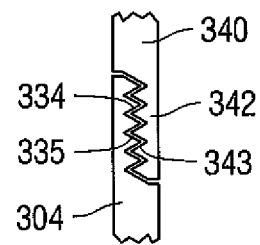

FIG. 1 is a front view of a tree mount bracket.
FIG. 2 is a top plan view of the tree mount bracket.
FIG. 3 is a perspective view of the tree mount bracket wherein a power cord is shown in dashed lines.
FIG. 4 is a perspective view of another embodiment of a shaft for use with the tree mount bracket shown in FIG. 1.
FIG. 5 is a front view of a second embodiment of a tree mount bracket having a side mounted fixture support member.
FIG. 6 is a side view of the second embodiment.
FIG. 7 is a top view of the second embodiment.
FIG. 8 is a front view of a third embodiment of a tree mount bracket having two side mounted fixture support members.
FIG. 9 is a top plan view of the third embodiment.
FIG. 10 is a front view of a fourth embodiment of the tree mount bracket having a fixture support plate.
FIG. 11 is a side view of the fourth embodiment.
FIG. 12 is a top plan view of the fourth embodiment.
FIG. 13 is a front view of a fifth embodiment of a tree mount bracket having a fixture support assembly.
FIG. 14 is a top plan view of the fifth embodiment.
FIG. 15 is a perspective view of a sixth embodiment of a tree mount bracket having a channel shaped support.
FIG. 16 is a perspective view of a seventh embodiment of a tree mount bracket having a channel shaped support.
FIG. 17 is a front sectional view of an eighth embodiment of a tree mount bracket having a ball shaft and tightening ring.
FIG. 18 is a top view of the ball shaft.
FIG. 19 is a top view of the tightening ring.
FIG. 20 is a front sectional view of the tree mount bracket having a ball shaft and tightening ring extending from a tree and supporting a light fixture.
FIG. 21 is an enlarged view of a portion an externally threaded extension portion of an adjustable light fixture treaded to an internal ring threaded portion of a tightening ring.

DESCRIPTION

A tree mount bracket 20 is shown in FIGS. 1-3. The tree mount bracket 20 is designed to threadably engage and support a light fixture 21 having an externally threaded light fixture portion 23, as shown in FIG. 1. The tree mount bracket 20 has a threaded member 22 and a fixture support member 24 that are joined to one another.

The threaded member 22 includes a shaft 30 that has opposed first and second shaft ends 32, 34. The first shaft end 32 is formed as a tip 36 and an external thread 38 extends from the first shaft end 32 and along the shaft 30. The second shaft end 34 is joined to a screw head 40. The screw head 40 is embodied such that it has four, six or eight sides such that the threaded member 22 can be rotated with a wrench or a socket wrench (not shown). The shaft 30 and screw head 40 are formed as one piece in one of the preferred embodiments and are made of metal, for example steel, stainless steel, plastic or other suitable materials. The shaft 30 has a length (designated L in FIG. 1) of ten inches in one of the preferred embodiments, but the length may be more or less than ten inches in other preferred embodiments.

The fixture support member 24 has a housing 42 having a cylindrical wall 44 and a base wall 46 that defines a base wall opening 48. The cylindrical wall 44 has opposed first and second ends 49, 50, and the first end 49 is joined to the base wall 46. The second end 50 of the cylindrical wall 44 defines a fixture support member opening 52 that leads to a housing interior 54. The cylindrical wall 44 has interior and exterior cylindrical wall surfaces 56, 58, and wrench engagement surfaces 60 extend from the exterior cylindrical wall surface 58 and are adapted to receive a wrench (not shown). The cylindrical wall 44 also has an internal cylindrical wall thread 62 that extends from the second end 51 of the cylindrical wall 44 in a direction towards the base wall 46. The cylindrical wall 44 also defines a wire slot 64 that extends from the second end 51 of the cylindrical wall 44 in a direction toward the base wall 46, and the wire slot 64 meets with a wire opening 66 defined in the cylindrical wall 44. The wire slot 64 and wire opening 66 are for accommodating a wire 67 (shown in dashed lines in FIG. 3). The fixture support member 24 can be made of plastic, metal and combinations thereof.

To assembly the tree mount bracket 20 the first shaft end 32 is moved through the base wall opening 48 until the screw head 40 abuts against the base wall 46 of the housing 42. Then, the base wall 46 is joined to the shaft 30 with an epoxy 47 or a bonding compound or other suitable material. It is pointed out that the tree mount bracket 20 can be painted virtually any desired color, or coated with a sealant having virtually any desired color. To install the tree mount bracket 20 the user can use a wrench and rotate the screw head 40 such that the tip 36 at the threaded end 32 is treaded to a tree, or other structure such as a beam or a post made of wood. A power drill having a suitable adapter tip may be used for drilling the tree mount bracket 20 into the tree. Alternatively, the user may use a wrench and engage it with the wrench engagement surfaces 60 and drill or screw the tree mount bracket 20 into the tree. A power drill having a suitable adapter may be used. The housing 42 may be embodied to have an internal diameter of 0.25, 0.50, 0.75, 1.0 inches or other desired internal diameter. It is pointed out that the tree mount bracket 20 can be installed with one hand, thus allowing the user to keep one hand free to complete other tasks, for example holding onto the tree, holding the light fixture, and the like. The externally threaded light fixture portion 23 of the light fixture 21 is then threaded to the internal cylindrical wall thread 62.

As shown in FIG. 4, in another preferred embodiment the second shaft end 34 has a flat surface 35 that surrounds a shaft recess 37. Surrounding walls 39 define the shaft recess 37, and the surrounding walls 39 are disposed so as to be able to accommodate a hex wrench (or an Allen wrench). The shaft 30 is joined to the fixture support member 24 with epoxy 47.

FIGS. 5-7 shows a second preferred embodiment of a tree mount bracket 20a. The tree mount bracket 20a has a threaded member 22 (that is the same as the one described in connection with the first embodiment). The tree mount bracket 20a also has a side mounted fixture support member 24a that is similar to the previously described fixture support member 24, but the side mounted fixture support member 24a does not have the previously described base wall 46 and wire opening 66. Rather, the wire slot 64 that extends completely through the cylindrical wall 44 from the first end 49 to the second end 51 of the cylindrical wall 44, such that the cylindrical wall 44 defines a passage 53. The cylindrical wall 44 has interior and exterior cylindrical wall surfaces 56, 58. Wrench engagement surfaces 60 extend from the exterior cylindrical wall 58 and are adapted to receive a wrench (not shown). The cylindrical wall 44 also has the previously described internal cylindrical wall thread 62 that extends from a second end 51 of the cylindrical wall 44 and extends in a direction towards the first end 49. Epoxy 47 joins the shaft 30 of the threaded member 22 to the exterior cylindrical wall surface 58, as shown.

FIGS. 8 and 9 depict a third preferred embodiment of a tree mount bracket 20b. The tree mount bracket 20b has a threaded member 22 (that is the same as the one described in connection with the first embodiment). There are two fixture support members 24a that are the same as the one described in connection with the above-described second embodiment. That is, there is a fixture support member 24a and another fixture support member 24a. The two fixture support members 24a are diametrically opposed and are at an angle relative to one another and slope in opposite directions. In one of the preferred embodiments the two fixture support members 24a are disposed at about a forty-five degree angle relative to one another, such that the cylindrical walls 44 slope in a direction toward the threaded member 22 such that the second ends 51 of the cylindrical walls 44 flare away from each other, thus providing space for when light fixtures are threaded to the cylindrical walls 44. Epoxy 47 joins the two fixture support members 24a to the threaded member 22.

FIGS. 10-12 depict a fourth preferred embodiment of a tree mount bracket 20c. The tree mount bracket 20c has a threaded member 22 (that is the same as the one described in connection with the first embodiment). The tree mount bracket 20c has a fixture support plate 100. The fixture support plate 100 defines a threaded member opening 102, fixture support plate opening 104, and a plate slot opening 106. The fixture support plate 100 has an internal plate thread 108 that defines and surrounds the fixture support plate opening 104. As shown, the fixture support plate opening 104 meets with the plate slot opening 106. The threaded member 22 is disposed in the threaded member opening 102 and held in place with epoxy 47. The fixture support plate 100 may comprise metal or plastic. A fixture can be threaded to the internal plate thread 108.

FIGS. 13 and 14 depict a fifth preferred embodiment of a tree mount bracket 20d. The tree mount bracket 20d has a threaded member 22 (that is the same as the one described in connection with the first embodiment). The tree mount bracket 20d has a fixture support assembly 140. The fixture support assembly 140 includes a first arm 142 that is joined at a first end 144 thereof to the threaded member 22 with an epoxy 47. The first arm 142 is substantially perpendicular to the threaded member 22. The fixture support assembly 140 also includes a second arm 148 and a fixture support ring 150. As shown, a second end 146 of the first arm 142 is joined to one end of the second arm 148 such that the second arm 148 is perpendicular to the first arm 142. The other end of the second arm 148 is joined to the fixture support ring 150 such that the second arm 148 is substantially perpendicular to the fixture support ring 150. The fixture support ring 150 has an internal thread 152 that defines a fixture support ring opening 154, and the fixture support ring 150 defines a ring slot 156 that meets with the fixture support ring opening 154. A central axis designated X passes through the threaded member 22 and the center point of the fixture support ring opening 154. The fixture support assembly 140 can be made of plastic or metal.

FIG. 15 is a sixth embodiment wherein there is a threaded member 22a and the second shaft end 35 of the threaded member 22a has internal bolt recess threads 200 that define a bolt recess 202. There is also a channel-shaped fixture mount 204 having a channel-shaped fixture mount opening 206 and a bolt 208. The bolt 208 is aligned with the channel-shaped fixture mount opening 206 and the bolt recess 202 and threaded to the internal bolt recess threads 200 to hold the channel-shaped fixture mount 204 to the threaded member 22a. The channel-shaped fixture mount 204 is adapted to support a light fixture (not shown in the drawing).

FIG. 16 is a seventh embodiment wherein there is a threaded member 22b having a second shaft end 35. A threaded extension member 220 extends from the second shaft end 35. There is also a channel-shaped fixture mount 204 having a channel-shaped fixture mount opening 206, and a wing nut 230 is provided. The channel-shaped fixture mount 204 is moved over the threaded extension member 220 and the wing nut 230 is threaded to the threaded extension member 220 and tightened. The channel-shaped fixture mount 204 is adapted to support a light fixture (not shown).

FIGS. 17-21 show an eighth embodiment of a ball and socket tree mount bracket 300 having a movable support component 301 that includes a ball shaft 302 and a tightening ring 304. The ball shaft 302 has a first ball shaft end portion 306 that is tapered and has external thread 308. The ball shaft 302 has an opposed second ball shaft end portion 310 that is a ball 312. The ball 312 defines an internal ball passage 314. The internal ball passage 314 leads from a point exterior to the ball 312, through the ball 312 and meets with a ball recess 316 defined in the ball 312. As shown, the ball recess 316 is defined by a substantially conical shaped interior ball surface 318. It is pointed out that the internal ball passage 314 and the ball recess 316 are adapted to receive and house a wire 67. In addition, surrounded by the ball 312 is a ball shaft head 320 that may be embodied as a recessed hex head 321 or may be embodied as a protruding head 323 (shown in dashed lines in FIG. 17) capable of being engaged with a wrench, such that the ball shaft 302 is capable of being screwed into a tree 322 or post or other wooden body.

As shown in FIG. 19 the tightening ring 304 defines a shaft opening 330 such that it can be fitted on the ball shaft 302. The tightening ring 304 defines a ball socket recess 332 sized to receive a portion of the ball 312 therein, and the ball socket recess 332 meets with the shaft opening 330. The tightening ring 304 also has an internal ring threaded portion 334 having an internal ring thread 335 that allows the tightening ring 304 to be threaded to an adjustable light fixture 340 as shown in FIGS. 20 and 21. In particular, the adjustable light fixture 340 has an externally threaded extension portion 342 having an external extension portion thread 343 that is treaded to the internal ring threaded portion 334 of the tightening ring 304, thus holding them together. In addition, the externally threaded extension portion 342 of the adjustable light fixture 340 defines a extension portion recess 344 that is capable of housing a portion of the ball 312 when the tightening ring 304 is threaded to the externally threaded extension portion 342 of the adjustable light fixture 340.

As shown in FIG. 20, the wire 67 extends though the internal ball passage 314 and though the ball recess 316. The wire 67 extends to the adjustable light fixture 340 and powers the bulb 350. The user is able to pivot the adjustable light fixture 340 (in the directions of arrows K-K and L-L) relative to the ball shaft 302 and tree 322 so as to be able to direct the light 370 in any desired direction. The user can also adjust the adjust the adjustable light fixture 340 by loosening the tightening ring 304, making the adjustment, then re-tightening the tightening ring 304.

It will be appreciated by those skilled in the art that while the tree mount bracket 20, 20a, 20b, 20c, 20d, the ball and socket tree mount bracket 300 and associated embodiments have been described in detail herein, the tree mount bracket 20' 20a, 20b, 20c, 20d, the ball and socket tree mount bracket 300 and associated embodiments are not necessarily so limited and other examples, embodiments, uses, modifications, and departures from the described embodiments, examples, and uses may be made. All of these embodiments are intended to be within the scope and spirit of the tree mount bracket 20, 20a, 20b, 20c, 20d, the ball and socket tree mount bracket 300 and associated embodiments.

What is claimed:

1. A tree mount bracket comprising:
   a threaded member;
   a fixture support member supported by the threaded member and wherein the threaded member is capable of being driven into wood;
   wherein the fixture support member has a housing that includes a cylindrical wall with opposed first and second ends and opposed interior and exterior cylindrical wall surfaces and an internal cylindrical wall thread is formed in the interior cylindrical wall surface proximal the second end that is adapted to thread to a light fixture;
   the threaded member has a shaft with opposed first and second shaft ends, with a tip formed at the first shaft end and an external thread extends from the first shaft end along the shaft and a screw head extends from the second shaft end; and,
   the fixture support member includes a base wall that is joined to the first end of the cylindrical wall and the base wall defines a base wall opening and the threaded member extends through the base wall opening and wherein the base wall is joined to the shaft such that the base wall abuts against the screw head, and the cylindrical wall defines a wire slot that extends from the second end of the cylindrical wall into the cylindrical wall.

2. The tree mount bracket according to claim 1 wherein the exterior cylindrical wall surface has wrench engagement surfaces adapted for engaging a wrench such that the threaded member is capable of being screwed into wood.

3. A tree mount bracket comprising:
   a threaded member;
   a fixture support plate that defines a threaded member opening, a fixture support plate opening, and a plate slot opening,
   the fixture support plate has an internal plate thread that surrounds the fixture support plate opening and the internal plate thread is adapted to thread to a light fixture;
   the threaded member has a shaft with opposed first and second shaft ends with a tip formed at the first shaft and an external thread extends from the first shaft end along the shaft and a screw head extends from the second shaft end and the threaded member is disposed in the threaded member opening such that the screw head abuts against the fixture support plate and the screw head and fixture support plate are joined.

4. A ball and socket tree mount bracket comprising:
   a movable support that includes a ball shaft and a tightening ring;
   the ball shaft having a first ball shaft end portion that has an external thread and an opposed second ball shaft end portion that is a ball and the ball defines an internal ball passage and a ball recess and the internal ball passage leads to the ball recess;
   wherein the tightening ring defines a shaft opening and socket recess such that the ball shaft is disposed in the shaft opening and the ball is disposed in the socket recess and the tightening ring has an internal ring threaded portion;
   an adjustable light fixture having an externally threaded extension portion with an extension portion recess that is capable of housing a portion of the ball and the externally threaded extension portion is threaded to the internal ring threaded portion of the tightening ring such that the tightening ring and the adjustable light fixture are capable of being moved while the ball shaft remains stationary; and, wherein a wire extends through the internal ball passage and the ball recess and connects to the adjustable light fixture.

5. The ball and socket tree mount according to claim 4 further including a wooden body and wherein the external thread of the first ball shaft end portion is screwed into the wooden body.

6. A tree mount bracket comprising:

a threaded member;

a fixture support member supported by the threaded member and wherein the threaded member is capable of being driven into wood;

wherein the fixture support member has a housing that includes a cylindrical wall with opposed first and second ends and opposed interior and exterior cylindrical wall surfaces and an internal cylindrical wall thread is formed in the interior cylindrical wall surface proximal the second end that is adapted to thread to a light fixture;

the threaded member has a shaft with opposed first and second shaft ends, with a tip formed at the first shaft end and an external thread extends from the first shaft end along the shaft and a screw head extends from the second shaft end; and, wherein the fixture support member is side mounted to the threaded member such that the second end of the cylindrical wall is proximal the screw head and the exterior cylindrical wall surface is joined to the shaft of the threaded member and wherein the fixture support member has a cylindrical wall that defines a wire slot and has an internal housing thread.

7. The tree mount bracket according to claim 6 further including another fixture support member that is side mounted to the threaded member and diametrically opposed to the fixture support member and the fixture support member and the another fixture support member are at about a forty-five degree angle relative to one another such that the fixture support member and the another fixture support member flare outwardly as they approach the screw head so as to provide clearance for light fixtures to be threaded to the fixture support member and the another fixture support member.

8. A tree mount bracket comprising:

a threaded member;

a fixture support member supported by the threaded member and wherein the threaded member is capable of being driven into wood;

wherein the fixture support member has a housing that includes a cylindrical wall with opposed first and second ends and opposed interior and exterior cylindrical wall surfaces and an internal cylindrical wall thread is formed in the interior cylindrical wall surface proximal the second end that is adapted to thread to a light fixture;

the threaded member has a shaft with opposed first and second shaft ends, with a tip formed at the first shaft end and an external thread extends from the first shaft end along the shaft and the second shaft end has a shaft recess that is defined in part by surrounding walls that are arranged relative to one another for form a hex-shape such that the shaft recess is hex-shaped, and wherein the cylindrical wall defines a wire slot that extends from the second end of the cylindrical wall to the first end of the cylindrical wall for accommodating a wire; and, wherein the fixture support member includes a base wall that is joined to the first end of the cylindrical wall and the base wall defines a base wall opening and the second end of the threaded member extends through the base wall opening and is joined to the base wall.

* * * * *